United States Patent
Klinglesmith et al.

(10) Patent No.: US 9,122,811 B2
(45) Date of Patent: *Sep. 1, 2015

(54) FLEXIBLY INTEGRATING ENDPOINT LOGIC INTO VARIED PLATFORMS

(71) Applicant: INTEL CORPORATION, Santa Clara, CA (US)

(72) Inventors: Michael Klinglesmith, Portland, OR (US); Mohan Nair, Portland, OR (US); Joseph Murray, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/968,504

(22) Filed: Aug. 16, 2013

(65) Prior Publication Data

US 2014/0052889 A1 Feb. 20, 2014

Related U.S. Application Data

(60) Continuation of application No. 12/965,553, filed on Dec. 10, 2010, now Pat. No. 8,537,848, which is a division of application No. 12/415,470, filed on Mar. 31, 2009, now Pat. No. 7,873,068.

(51) Int. Cl.
*H04L 12/66* (2006.01)
*G06F 13/00* (2006.01)
(Continued)

(52) U.S. Cl.
CPC .......... *G06F 13/4027* (2013.01); *H04L 12/1845* (2013.01); *H04L 12/6418* (2013.01);
(Continued)

(58) Field of Classification Search
CPC ... G01R 31/2884; G06F 1/3203; G06F 15/16; G06F 13/40; G06F 13/42; G06F 13/10; G06F 2213/0026; H01L 21/00; H01L 12/66; H01L 12/64; H01L 12/18; H01L 12/6418; H01L 12/1845; H01L 29/08468; H01L 67/1078
USPC ......... 370/419, 216–220, 420, 249–253, 389, 370/391, 462; 710/313, 105, 104, 312, 316, 710/309, 240, 243, 310, 314; 714/49
See application file for complete search history.

(56) References Cited

U.S. PATENT DOCUMENTS 6,009,488 A 12/1999 Kavipurapu
6,799,278 B2 9/2004 Khatri et al.
(Continued)

FOREIGN PATENT DOCUMENTS

CN 101262439 A 9/2008
CN 102326362 A 1/2012
CN 101873339 5/2013

OTHER PUBLICATIONS

The State Intellectual Property Office of the People's Republic of China, Office Action mailed Aug. 13, 2013 in Chinese application No. 2010800095730.
(Continued)

*Primary Examiner* — Hanh N Nguyen
(74) *Attorney, Agent, or Firm* — Trop, Pruner & Hu, P.C.

(57) ABSTRACT

In one embodiment, the present invention is directed to an integrated endpoint having a virtual port coupled between an upstream fabric and an integrated device fabric that includes a multi-function logic to handle various functions for one or more intellectual property (IP) blocks coupled to the integrated device fabric. The integrated device fabric has a primary channel to communicate data and command information between the IP block and the upstream fabric and a sideband channel to communicate sideband information between the IP block and the multi-function logic. Other embodiments are described and claimed.

27 Claims, 6 Drawing Sheets

(51) Int. Cl.
  G06F 13/40 (2006.01)
  H04L 12/64 (2006.01)
  H04L 12/18 (2006.01)
  H04L 12/40 (2006.01)
  G06F 13/42 (2006.01)
  G06F 13/10 (2006.01)
  H04L 29/08 (2006.01)

(52) U.S. Cl.
  CPC ........... *G06F13/105* (2013.01); *G06F 13/4221* (2013.01); *G06F 2213/0026* (2013.01); *H04L 12/40032* (2013.01); *H04L 29/08468* (2013.01); *H04L 67/1078* (2013.01)

(56) References Cited

U.S. PATENT DOCUMENTS

| | | | |
|---|---|---|---|
| 6,915,365 | B2 | 7/2005 | Creta et al. |
| 7,260,664 | B2 | 8/2007 | Arndt et al. |
| 7,356,636 | B2 | 4/2008 | Torudbakken et al. |
| 7,743,189 | B2 | 6/2010 | Brown et al. |
| 7,743,197 | B2 | 6/2010 | Chavan et al. |
| 7,778,245 | B2 | 8/2010 | Cameron et al. |
| 7,873,068 | B2 * | 1/2011 | Klinglesmith et al. ....... 370/463 |
| 8,125,103 | B2 * | 2/2012 | Ito ................................... 307/72 |
| 8,537,848 | B2 * | 9/2013 | Klinglesmith et al. ....... 370/419 |
| 2002/0083349 | A1 | 6/2002 | Khatri |
| 2003/0182482 | A1 | 9/2003 | Creta |
| 2005/0147117 | A1 | 7/2005 | Pettey et al. |
| 2006/0123137 | A1 | 6/2006 | DeHaemer et al. |
| 2006/0242353 | A1 | 10/2006 | Torudbakken et al. |
| 2007/0204095 | A1 | 8/2007 | Sandy et al. |
| 2007/0208898 | A1 | 9/2007 | Pettey et al. |
| 2008/0147943 | A1 | 6/2008 | Freimuth et al. |
| 2008/0244146 | A1 | 10/2008 | Das et al. |
| 2008/0263248 | A1 | 10/2008 | Harriman |
| 2009/0077297 | A1 | 3/2009 | Zhao et al. |
| 2009/0235008 | A1 | 9/2009 | Deshpande et al. |
| 2010/0161872 | A1 | 6/2010 | Daniel |
| 2011/0080920 | A1 | 4/2011 | Klinglesmith et al. |
| 2011/0131362 | A1 * | 6/2011 | Klinglesmith et al. ....... 710/313 |
| 2011/0131456 | A1 | 6/2011 | Klinglesmith et al. |

OTHER PUBLICATIONS

Patent Cooperation Treaty, Notification of Transmittal of the International Search Report and the Written Opinion of the International Searching Authority mailed Mar. 5, 2010 in International application No. PCT/US2010/026284.
German Patent and Trade Mark Office, Office Action mailed Mar. 13, 2013 in German application No. 11 2010 001 469.8.
U.S. Patent and Trademark Office, Office Action mailed Jan. 10, 2013 with Reply filed Apr. 2, 2013 in U.S. Appl. No. 13/025,319.
Chinese Patent Office, Office Action mailed Jun. 20, 2012 in Chinese application No. 201010158566.9.
Anonymous, PCI Express Base Specification Revision 2.1., Mar. 4, 2009, pp. 1-2, PCI-SIG, www.pcisig.com.

* cited by examiner

FLEXIBLY INTEGRATING ENDPOINT LOGIC INTO VARIED PLATFORMS

This application is a continuation of U.S. patent application Ser. No. 12/965,553, filed Dec. 10, 2010, which is a divisional of U.S. patent application Ser. No. 12/415,470, filed Mar. 31, 2009, now U.S. Pat. No. 7,873,068, issued Jan. 18, 2011, the content of which is hereby incorporated by reference.

BACKGROUND

Mainstream processor chips, both in high performance and low power segments, are increasingly integrating additional functionality such as graphics, display engines, security engines, PCIe™ ports (i.e., ports in accordance with the Peripheral Component Interconnect Express (PCI Express™ (PCIe™)) Specification Base Specification version 2.0 (published Jan. 17, 2007) (hereafter the PCIe™ specification) and other PCI-e™ based peripheral devices.

Traditional peripheral hub product designs are highly segmented due to varying requirements from the server, desktop, mobile, embedded, ultra-mobile and mobile Internet device segments. Different markets seek to use single chip system-on-chip (SoC) solutions that combine at least some of processor cores, memory controller hub (MCH), input/output controller (ICH) and other segment specific acceleration elements onto a single chip. However, designs that accumulate these features are slow to emerge due to the difficulty of integrating different intellectual property (IP) blocks on a single die to standard internal interconnects.

DETAILED DESCRIPTION

Figure 1:
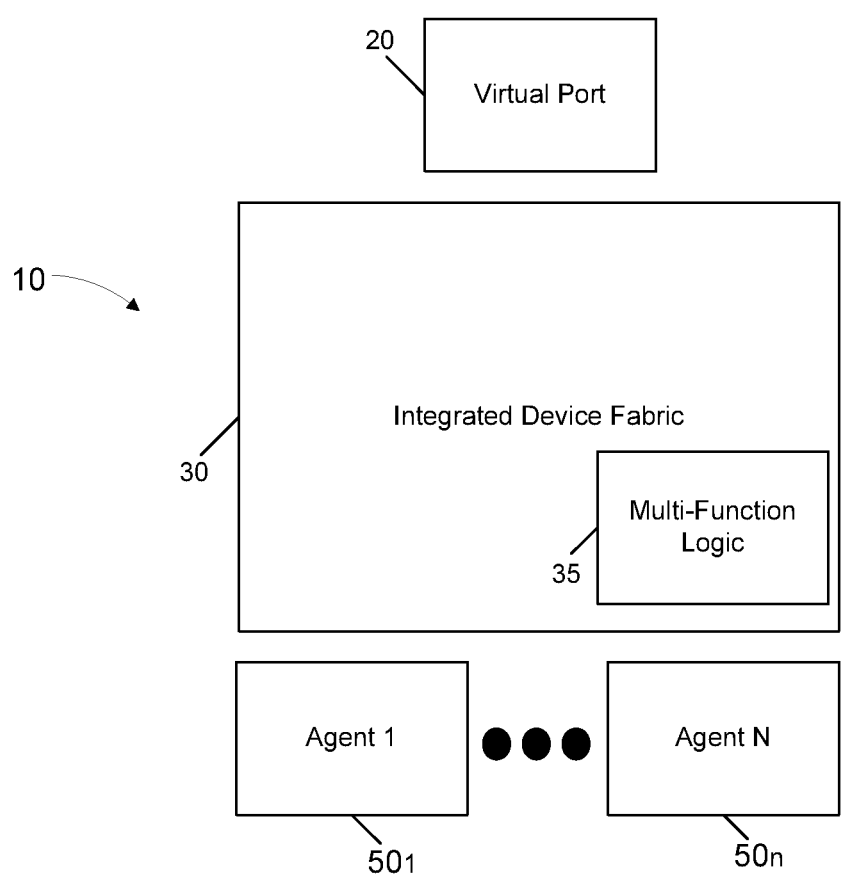
FIG. 1 is a block diagram of an integrated endpoint and virtual port in accordance with an embodiment of the present invention.

In various embodiments, interface functionality of a PCIe™ endpoint can be segmented between fabric logic and an agent such as an intellectual property (IP) block or other logic block configured to perform one or more functions, to enable efficient re-use of the agent across various platforms. As used herein, the terms "agent" and "IP block" may be synonymous to denote an independent logic that can be adapted within a semiconductor device along with other such agents, where the agents can originate with one or more vendors. For one implementation, such an agent can be implemented on-chip along with a virtual downstream port (root port or switch port) which may be a separate PCIe™ device, an integrated device fabric (IDF) containing multi-function (MF) logic, and one or more agents, which each can implement one or more PCI-e™ functions. In this way, one or more agents can be integrated into an on-die PCI-e™ device.

The virtual downstream port appears to software as a standard PCI-e™ downstream port, however the link and physical layers are removed and replaced with a master interface to communicate with an upstream component, e.g., a processor, and target interface to communicate with the IDF. In one embodiment, the virtual downstream port includes a type 1 PCIe™ configuration header and associated virtual peer-to-peer bridge logic. The virtual port appears to software as a "real" port, but the link and physical layers are missing. Software can not tell the difference. Various values for link and physical registers may be set within the virtual port such that software thinks the link and physical layers are present. In turn, the IDF, MF logic and agents appear to software as a PCI-e™ endpoint. Software can not tell that the endpoint is not connected to the downstream port with a standard PCI-e™ link, as the same functionality and information is presented. That is, the combination of virtual port and IDF, MF logic and agents enables complete transparency to software such as a shrink-wrap operating system (OS). In addition, this interface is plug-and-play OS compatible and supports various functions such as PCI plug-and-play enumeration and PCI ordering, among other functions.

In one embodiment, the integrated device fabric is an implementation of a fabric that contains MF logic. The MF logic provides the functionality necessary to enable separate agents designed to an interface specification to interoperate and appear to software as a standard PCI-e™ multi-function device, e.g., coupled via an off-chip (e.g., PCIe™) link. This fabric provides the flow control, arbitration and ordering logic. In addition, the multi-function logic supports various functional requirements of a given standard. For example, in one embodiment the MF logic may include logic to handle maximum payload size in devices which support the Alternate Requester ID Interpretation (ARI), legacy interrupts, PCI power management (PM) messages, non-function specific errors, and latency tolerance reporting.

Coupled to this IDF may be one or more agents to implement one or more PCI-e™ functions. The agents can be integrated directly into a root complex fabric or be connected below an integrated device fabric as described below. The IDF in conjunction with the agents form an integrated PCIe™ endpoint that can be connected to an integrated virtual port (root port or switch port).

Embodiments thus allow standard agents designed to an interface specification to be re-used between projects, either as functions within a multi-function device or as root complex integrated devices. There are no restrictions on the agents that limit them from implementing the full feature set of the PCI-e™ specification. By removing link and physical layers and replacing the layers with a fabric, the need for various logic of such layers, e.g., cyclic redundancy checksum (CRC) and replay buffers, is eliminated. This creates a lower latency, lower power, smaller design solution.

Re-use is enhanced by design rules to enable efficient partitioning of logic between agent and fabric. A PCIe™ device typically has certain logic that is common to the entire device and certain logic that is specific to a function. Embodiments of the present invention define the partitioning and implementation of what logic is situated in an agent (or one or more functions), and what logic is situated in the fabric (or device specific logic) to optimize the re-use across a wide variety of platforms. Part of the design goal is to enable the agent to be easily used as part of a device that is integrated into different components such as endpoints, fabrics and can be integrated inside or outside a root complex. Thus certain functionality and complexity are included into the fabric because they are not needed when an agent is present inside a root complex.

Referring now to FIG. 1, shown is a block diagram of an integrated endpoint connected to a virtual port which may be formed on a single semiconductor die in accordance with an embodiment of the present invention. As shown in FIG. 1, integrated endpoint 10 may include an IDF 30 and one or more agents 50, and may be coupled to a virtual port 20, which may be a virtual root port or a virtual switch port, depending upon the entity to which integrated endpoint 10 is coupled. For example, when coupled to a root complex fabric, virtual port 20 may be a virtual root port, while instead when coupled to a switch fabric, virtual port 20 may be a virtual switch port. In various embodiments, virtual port 20 may be an architecturally visible register space, and may include a set of configuration registers for supporting plug-and-play and function discovery. In turn, virtual port 20 is coupled to IDF 30 that includes multi-function logic 35.

In turn, IDF 30 may be coupled to one or more agents $50_1$-$50_n$. Each such agent is an independent IP block and may be used to perform one or more functions such as one or more PCI-e™ functions. In various embodiments, in contrast to a conventional coupling of such agents via a PCI-e™ or other link, the integrated, i.e., on-die, coupling of agents 50 to virtual port 20 may be realized by IDF 30. In this way, the need for link and physical layers, both at virtual port 20 and agents 50 (and also IDF 30) can be avoided. Instead virtual port 20 may communicate directly with IDF 30 at the transaction layer, and similarly IDF 30 may communicate directly with agents 50 at the transaction layer. Note that the agents as exemplified by agents 50 may be heterogeneous blocks of one or more different vendors. For example, a SoC manufacturer may include various agents in a single on-die solution that includes both its own agents, as well as one or more agents of other vendors, e.g. to provide or enhance certain functionality.

Figure 2:
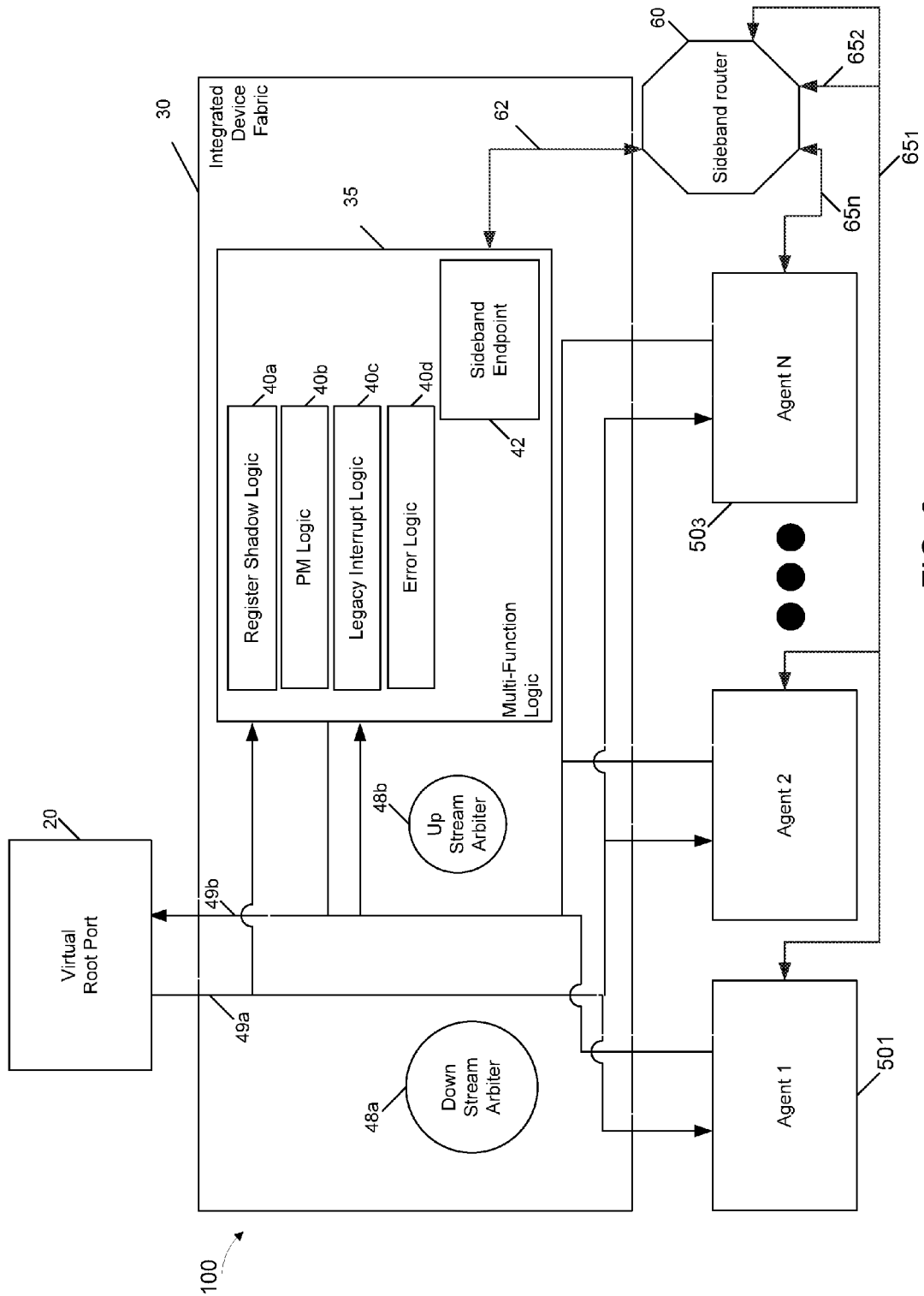
FIG. 2 is a block diagram of an integrated endpoint and virtual port in accordance with one embodiment of the present invention.

Referring now to FIG. 2, shown is a block diagram of an integrated endpoint 100 coupled to a virtual port. This integrated endpoint may be similarly configured to that of FIG. 1. However, further details of IDF 30 are presented. More specifically, as shown in FIG. 2, IDF 30 may include multi-function logic 35 that includes a plurality independent logics 40a-40d (for example) that can handle various functionality that enables interaction of different agents in integrated endpoint 100 while maintaining visibility with system software (e.g., an operating system). In the embodiment of FIG. 2, such logic includes register shadow logic 40a, power management (PM) logic 40b, legacy interrupt logic 40c and error logic 40d. While shown with these particular logic functionalities, the scope of the present invention is not limited in this regard, and other logic may be present in MF logic 35. In addition, multi-function logic 35 includes a sideband endpoint 42 for coupling to a sideband router 50 via a sideband channel 62.

Still referring to FIG. 2, IDF 30 further includes arbiters both in the upstream and downstream directions (i.e., arbiters $48_a$-$48_b$). Such arbiters may handle flow control and arbitration between communications with the various agents, e.g., according to a credit flow control and priority arbitration scheme. Arbiter 48a and 48b may check the resources of agents 50 to ensure there is space in the queues, and in the upstream direction it checks resources and arbitrates which agent can have access to the upstream primary channel 49b. In one embodiment, arbiter 48a may act as a traffic cop for the command wires and operate in two phases. First a command is sent to the agents to perform target decode, i.e., it is broadcast to all agents. Then, the target agent responds. As the arbiter now knows who the target is, next the arbiter checks its resource availability, and once it determines that the resources are available, it can issue the grant and the actual command and data are provided to the target agent.

Communication with agents 50 may occur via a primary channel 49, which may include separate links $49_a$ and $49_b$ in the downstream and upstream direction, respectively. In one embodiment, primary channel 49 may have different wires present for command and data information. As further seen, sideband router 60 may communicate with each agent 50 via a given sideband channel $65_1$-$65_3$. Note that peer-to-peer communications between agents 50 are allowed, although not shown in FIG. 2. While shown with this particular implementation in the embodiment of FIG. 2, the scope of the present invention is not limited in this regard.

In other implementations of an integrated device fabric, instead of coupling to agents in which all of the command and data widths are the same, the fabric may perform queuing and staging to accept multiple clocking data and then widen it out, or vice versa. For ease of illustration, no internal queuing is shown in FIG. 2, although embodiments may provide for such queuing. Further, while in some embodiments, downstream messages may be broadcast to all connected agents, which perform a decode to determine whether a command is for the given agent, other embodiments may implement decoding in the IDF. For example, downstream queues may be present to accept transactions from the root port, which are then passed to an internal decoder to determine the intended target.

An agent that implements one or more PCI-e™ functions may be integrated into a root complex fabric, below a virtual root port as a portion of an integrated device, or in a standalone PCI-e™ endpoint component. In order to enable re-use of an agent in these different systems, certain functionality is partitioned between the fabric and the agent, as described above. In addition, protocols on how certain messages are sent through the IDF are established.

An integrated function is an agent which implements one or more PCI functions. These may be legacy PCI functions or PCIe™ compliant functions. Integrated functions that support the ARI may implement up to 256 functions in one agent. Some embodiments may support single root IO virtualization (SR-IOV), enabling up to 64 k functions within an integrated function.

When connected to a root complex fabric, the functions within an integrated function become a root complex integrated endpoint. When connected to a switch fabric, the integrated functions are a part of a multi-function device that includes an upstream switch port. When connected to an integrated device fabric, the integrated functions are a part of an integrated PCIe™ endpoint. Thus to maximize re-usability, integrated functions can be implemented such that they can connect to a root complex fabric, a switch fabric or an integrated device fabric. Note that additional functionality when integrated functions are used to create a PCIe™ endpoint may be present.

Still referring to FIG. 2, legacy interrupt logic 40c may be used to handle agents that may generate PCI legacy interrupts. Agents which implement PCI or PCI-e™ compliant functions that generate interrupts are required by the PCI and PCI-e™ specifications to support legacy interrupts. The destination for these legacy interrupts is an input/output advanced programmable interrupt controller (IOxAPIC). Interrupt wires (i.e., legacy interrupt wires (INTx#)) are virtually delivered using messages. An Assert INTx# message indicates a high to low transition of the virtual INTx# signal, while a DeAssert INTx# message indicates the low to high transition of the virtual INTx# signal.

In various embodiments, INTx messages can be delivered on both primary and sideband message interfaces. To ensure interoperability of the agents the following rules are used for delivery of legacy interrupts. Agents that are the originating source of INTx messages (e.g., endpoint or root port) will send them using sideband messages. Agents that contain more than one PCI/PCI-e™ function that share INTx virtual wires logically OR the virtual wires together before sending the assert/de-assert messages. Agents that contain more than one PCI/PCI-e™ function that do not share INTx virtual wires send the messages with different sideband source IDs, enabling the receiver to differentiate the source of the INTx message.

Legacy interrupt logic 40c aggregates the legacy INTx messages that are shared by the agents below the fabric. The aggregated virtual INTx wire state is then forwarded upstream on primary channel 49. Agents that implement a PCI-e™ root port will send legacy INTx messages on a sideband channel targeting a local IOxAPIC.

PM logic 42b may be used to provide support for PCI power management (PCI-PM). The following three messages may be used to handle power management events, namely a power management event message, and similar turn off and turn off acknowledgment messages: PME, PME Turn Off (TO), and PME TO Ack. In one embodiment, the PCI-PM message contains a message code to indicate if the message is a PME, PME Turn Off, or PME TO Ack. The message also contains the bus, device and function number of the message originator.

To support interoperability of agents that implement the PCI power management capabilities, the following rules are used. Agents that implement the PCI-PM capability send PME messages, receive PME turn off messages, and send PME TO Ack messages on the sideband message interface. In turn, IDF 30 provides the following functionality. First, the IDF receives PME Turn Off messages on the upstream primary interface and broadcasts them to any coupled agents that support PCI-PM (this may be done as a true multicast, or as multiple unicast messages). Also, the IDF receives PME TO Ack messages over the sideband message interface, aggregates the messages and forwards a PME TO Ack message upstream on the primary interface, and receives PME messages on the sideband message interface and forwards them upstream on the primary interface. Agents that implement PCI-e™ root ports receive PME Turn Off messages on the sideband message interface and forward them downstream on the primary channel, and receive PME TO Ack messages from downstream (over an IDF for virtual root ports, over PCI-e™ link for actual root ports) and forward PME TO Ack message on sideband message interface. Agents that implement a PCI-e™ root complex event collector will receive PME messages on the sideband message interface.

Error logic 40d may provide support for PCI-e™ error messages, which include the following three messages: error corrected (ERR CORR), error non-fatal (ERR NONFATAL), and error fatal (ERR FATAL). To support interoperability of agents which implement these messages, the following rules can be used in one embodiment. Agents that generate PCI-e™ error messages send error messages on the sideband message interface, and integrated device fabric 30 receives error messages on the sideband message interface and forwards them upstream on primary channel 49. Agents that implement PCI-e™ root ports receive error messages either across the PCI-e™ link or on the downstream side primary channel if implemented as a virtual root port. Agents that implement a PCI-e™ root complex event collector will receive error messages on the sideband message interface. In other implementations such messages can be sent on the primary interface.

The PCI-e™ error messages contain a requester ID (which may include bus number, device, and function) and a message code. The PCI-e™ specification indicates that non-function specific errors that occur at an endpoint are logged in every function, however only one error message is sent for each enabled severity. For example, if all functions are programmed to treat the error as fatal, then only one fatal error message is sent, but if some functions are programmed to treat the error as fatal and others are programmed to treat the error as non-fatal, then one fatal and one non-fatal error message are sent. The following errors may be non-function specific: unsupported request (UR), when caused by no function claiming a transaction layer packet (TLP); unexpected completion when caused by no function claiming a completion; malformed TLP; end CRC (ECRC) fail; receiver overflow; and flow control protocol error. Note that in various embodiments, the last two are not applicable. ECRC fail is optional and can only occur if ECRC checking is enabled.

It is the responsibility of error logic 40d of the integrated device fabric 30 to determine that a transaction results in a non-function specific error. On detection of a non-function specific error, the IDF will assert a put with a non-specific error signal (cmd nfserr) to every downstream agent that is a part of the integrated device. When an agent receives a put with the cmd nfserr asserted, it logs the error but does not send any error message even if it is configured to send a message. MF logic 35 is responsible for sending the appropriate error messages. A single bit strap is used in the integrated function to know that it is connected below an integrated device fabric.

MF logic 35 shadows the necessary bits from every function below the integrated device fabric that indicates which severity error the function should report for that error. In one embodiment, a table may be provided in error logic 40d to indicate which bits are required. The integrated device fabric thus detects that the error has occurred and broadcasts the TLP to all integrated functions below the integrated device fabric. The broadcast can be done with a simultaneous put, or sequential puts to all targets. The MF logic will then check the shadow copies of the error configuration bits and send the correct error messages upstream.

MF logic 35 may further include register shadow logic 40a. If any function in an agent implements PCI-e™ ARI capability, then they must all implement ARI. Each integrated function that implements the ARI capability implements a private maximum payload size register that is separate from the PCI-e™ defined maximum payload size configuration register, and a strap input to indicate if the integrated function is instantiated in a root complex or outside a root complex. This register is accessible from the sideband message interface. When the integrated function is strapped to indicate that it is outside of the root complex, then all functions with a function number other than zero ignore the PCI-e™ specification-defined maximum payload size register and use the private register for the maximum payload size value. It is the responsibility of register shadow logic 40a of MF logic 30 to shadow function's 0's maximum payload size value into the other agents connected to IDF 30. MF logic 35 may include other functions, in some embodiments. In one embodiment, each agent may send a latency message over the sideband channel to the multi-function logic, which aggregates messages, takes the worst case latency number and sends it to the virtual port for reporting upstream.

Figure 3:
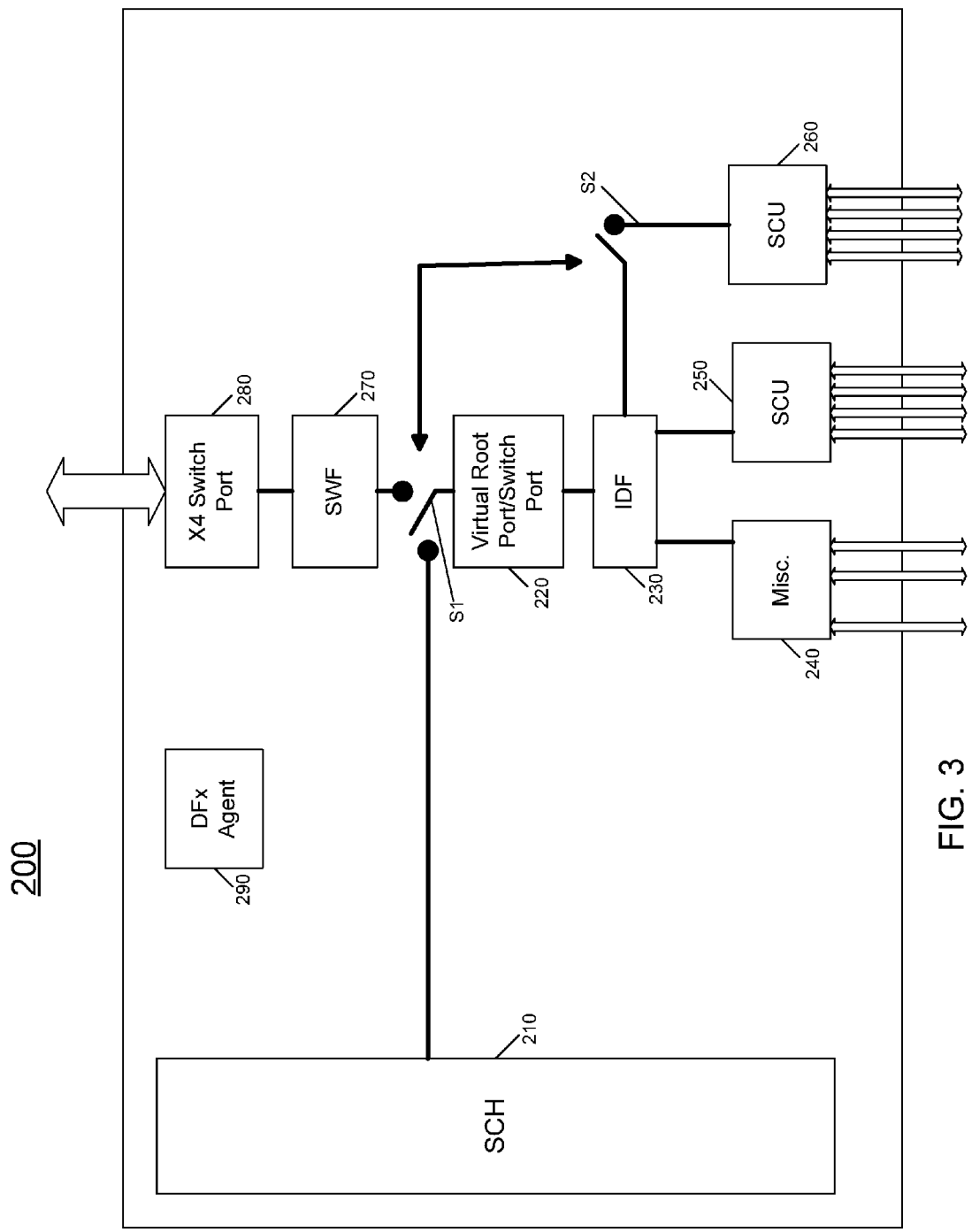
FIG. 3 is a block diagram of a system-on-chip (SoC) in accordance with one embodiment of the present invention.

Referring now to FIG. 3, shown is a block diagram of a system-on-chip (SoC) in accordance with one embodiment of the present invention. As shown in FIG. 3, SoC 200 may be a single die device that includes various entities that perform different functions. As shown in FIG. 3, a server controller hub (SCH) 210 may provide an interface to a system controller such as a central processing unit (CPU) or other main processing entity. Via various settings, e.g., fuse select settings such as fusible links represented by switches S1 and S2, may be controlled to enable coupling of different circuitry to SCH 210. As seen, switch S1 may enable direct coupling of a virtual port 220, which may be a virtual root port or a virtual switch port directly to SCH 210. When S1 connects virtual port 220 to SCH 210, virtual port 220 is a root port. In an alternate configuration, virtual port 220 may couple directly to a switch fabric (SWF) 270. When S1 connects virtual port 220 to SWF 270, it is a switch port. Switch S2 may be controlled to couple an integrated device fabric 230 to a storage controller unit (SCU) 260 or to disable such coupling.

As further shown in FIG. 3, IDF 230 may be coupled to an interface 240, which may provide an interface to various off-chip devices such as SMBUS, non-volatile SRAM, serial flash, and Ethernet. Still further, IDF 230 may couple to a SCU 250 that also can couple to various off-chip devices, such as disk drives or a SAS network. Still further, in a given implementation, switch S1 may enable direct coupling of virtual port 220 to switch fabric 270, which in turn couples to one upstream switch port 280 which may be coupled to downstream switch ports (not shown), which couple to an off-chip endpoint. SoC 200 may further include a design for test (DFx) agent 290 to perform various design for test functions. While shown with this particular implementation in the embodiment of FIG. 3, the scope of the present invention is not limited in this regard.

Figure 4:
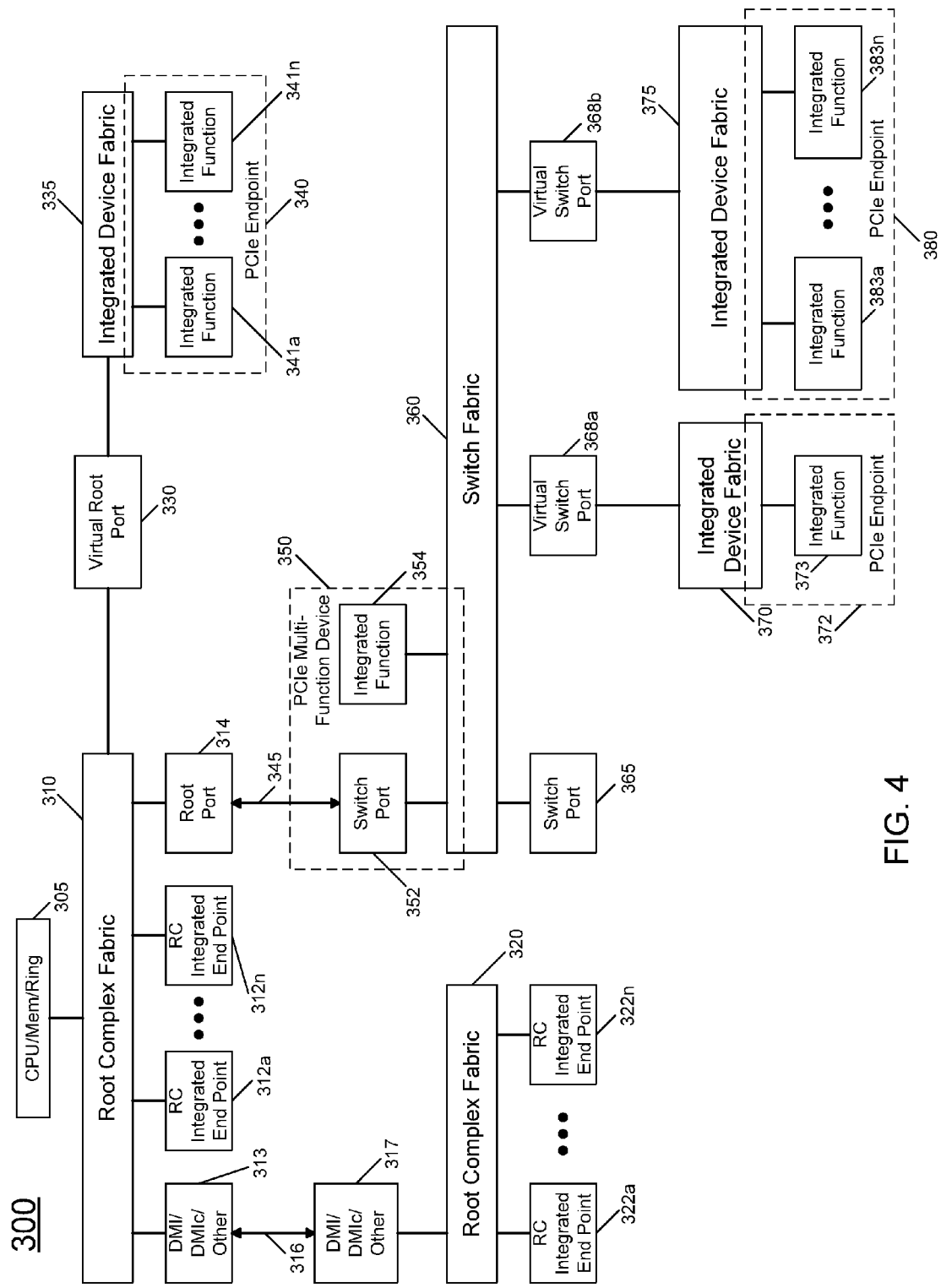
FIG. 4 is a block diagram of a system in accordance with an embodiment of the present invention.

Embodiments may further be implemented in a broader system context, such as a PCIe™/PCI system. Referring now to FIG. 4, shown is a block diagram of a system 300 in accordance with an embodiment of the present invention. As shown in FIG. 4, system 300 may include various fabrics to couple different types of functions and devices to upstream components such as a main CPU and memory complex, represented by CPU 305. While shown as a single block, understand that CPU 305 may include one or more CPUs and local memory, which may be implemented in a bridge or ring topology, for example. CPU 305 couples to a root complex fabric 310.

Root complex 310 may denote the root of an IO hierarchy that connects CPU 305 to the IO subsystem. As seen, various entities may be coupled to root complex 310, including root complex integrated endpoints $312_a$-$312_n$, root ports including a physical root port 314 and a virtual root port 330, and another such interface 313 which, in one embodiment may be a DMI or DMIc interface. In the embodiment of FIG. 4, some of these interfaces and ports may couple off-die via cross-die connections 316 and 345, while virtual root port 330 may be integrated on-die to an integrated device fabric 335 that in turn is coupled to an integrated PCIe™ endpoint 340 including one or more integrated functions $341_a$-$341_n$. Thus, to the software executing on CPU 305, both root port 314 and virtual root port 330 may appear as being coupled to off-chip PCIe™ devices. Note that endpoints $312_a$-$312_n$ and functions $341_a$-$341_n$ are designed to the same rules such that a system integrator can choose to instantiate an agent as either a RC integrated endpoint or an integrated function without making changes to the re-usable agent implementation.

Still further shown in FIG. 4, cross-die connection 316 may couple to another interface 317 which in turn couples to a root complex fabric 320, to which one or more root complex integrated endpoints $322_a$-$322_n$ may be coupled.

Via cross-die connection 345, a PCIe™ multi-function device 350 may be present, which may also couple to a switch fabric 360 via a switch port 352 and an integrated function 354. In turn, switch fabric 360 may couple to various downstream ports including a switch port 365 and virtual switch ports $368_a$ and $368_b$. These virtual switch ports may couple to IDFs 370 and 375, each of which may include one or more PCI endpoints coupled thereto. In the embodiment shown in FIG. 4, a PCIe™ endpoint 372 may include an integrated function 373, and a PCIe™ endpoint 380 may include integrated functions $383_a$-$383_n$. While shown with this particular implementation in the embodiment of FIG. 4, the scope of the present invention is not limited in this regard.

Figure 5:
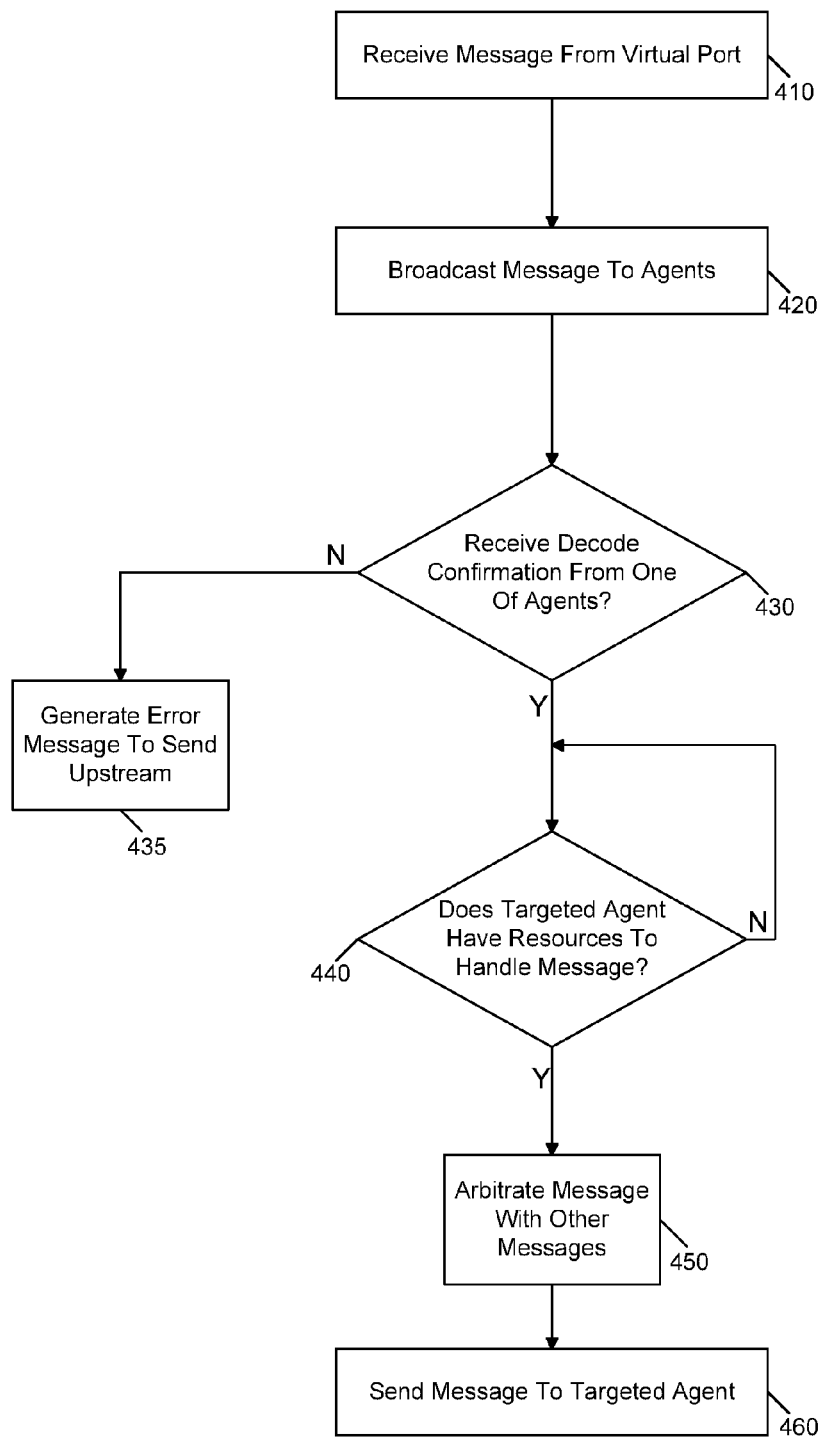
FIG. 5 is a flow diagram of a method in accordance with one embodiment of the present invention.

Referring now to FIG. 5, shown is a flow diagram of a method in accordance with one embodiment of the present invention. As shown in FIG. 5, method 400 may be implemented in an integrated device fabric to handle incoming messages from an upstream-connected device coupled thereto. As shown in FIG. 5, method 400 may be used for handling incoming messages received from upstream components, such as a virtual port to which the IDF is coupled (block 410).

When received in the IDF, a message which may be a command, may be broadcast to all downstream agents via a primary channel (block 420). Then the IDF may determine whether it receives a decode confirmation from one of the agents (diamond 430). That is, as discussed above transmission of messages downstream may occur in a two-phase process where the message is first broadcast to all agents, which perform their own target decode. If the message is not intended for any of the downstream components, an error message may be generated and sent upstream (block 435).

If instead a target confirmation is received from one of the agents, control passes to diamond 440 where it may be determined whether the targeted agent has resources to handle the message (diamond 440). If so, control passes to block 450, where the message may be arbitrated with other messages for transmission downstream. Then at block 460 the message may be sent to the targeted agent. Of course, other mechanisms for handling received messages may be used in other embodiments. For example, as discussed above address decode may occur in the fabric itself in some implementations.

Figure 6:
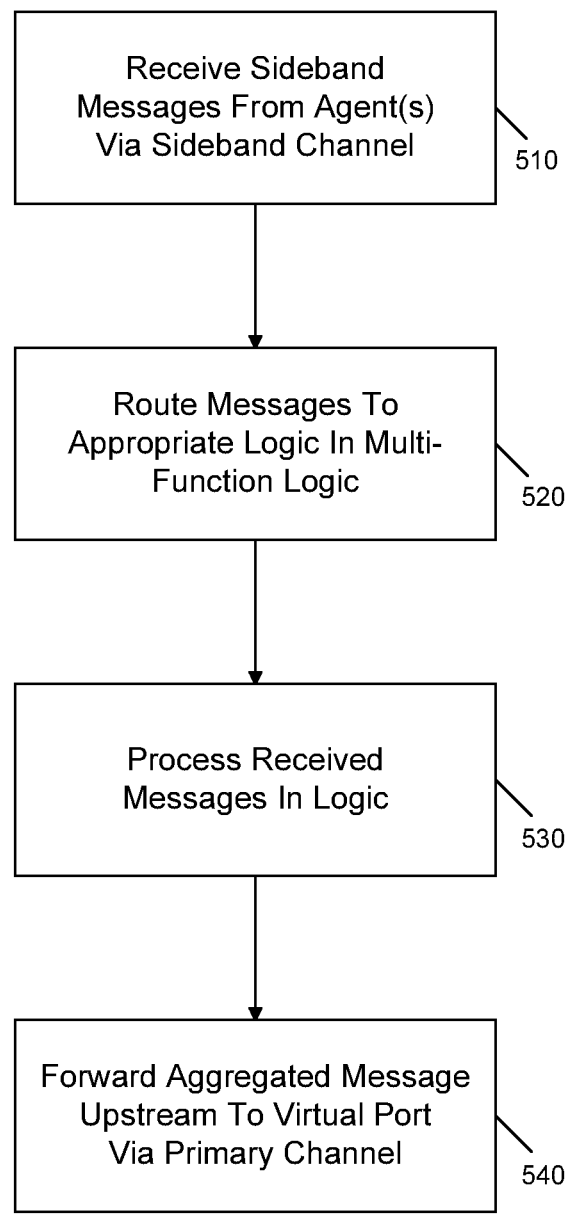
FIG. 6 is a flow diagram of a method for handling incoming messages from coupled agents in accordance with one embodiment of the present invention.

Referring now to FIG. 6, shown is a flow diagram of a method for handling incoming messages from coupled agents. As shown in FIG. 6, method 500 may begin by receiving sideband messages from one or more agents via a sideband channel (block 510). For example, incoming sideband messages may be provided to a sideband endpoint, which may be part of multi-function logic of an integrated device fabric. This endpoint may route messages to an appropriate logic within the multi-function logic (block 520). For example, error messages may be sent to error logic, power management messages sent to power management logic and so forth. The given logic may then process the received messages (block 530). For example, as discussed above the logic may perform an aggregation of multiple sideband messages to thus form an appropriate aggregated message for transmission upstream. Then, as shown in FIG. 6, the aggregated message may be forwarded upstream, e.g., to a virtual port via the primary channel (block 540).

Using embodiments of the present invention a standard solution can thus be realized for implementing agents that can be used as either root complex integrated devices or non-root complex integrated devices. Accordingly re-use of agents across various products can occur such that agents of one or more vendors can be incorporated into a single die integrated circuit.

Note that embodiments provide for identical integration of an IP block below a PCI-e™ switch, switch port, PCIe™ root port, or directly below a root complex. In contrast, according to the PCI-e™ specification, switches are not allowed to integrate a device on an internal bus. (PCI-e™ specification language: "Endpoints (represented by Type 00h Configuration Space headers) must not appear to configuration software on the Switch's internal bus as peers of the virtual PCI-to-PCI Bridges representing the Switch Downstream Ports."). However, as shown in FIG. 4 an IP block can be integrated as a function of an integrated device that contains a switch upstream port. In this case switch fabric 360 is a single fabric that carries traffic for two logical PCI buses associated with the primary and secondary side of the upstream switch port virtual peer-to-peer bridge.

Embodiments may also be fully PCI-e™ complaint, allowing agents designed to a standard interface to be used inside of a root complex or in an integrated device. Also using an IDF having multi-function logic in accordance with one embodiment of the present invention provides a standard way to handle interactions between agents such that agents from different providers can be connected together into a single multi-function device.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a semiconductor die comprising:
a virtual port coupled between a first fabric and an integrated device fabric, the virtual port including a first interface to interface with the first fabric and a second interface to interface with the integrated device fabric;
the integrated device fabric to be coupled to at least one endpoint and to include a primary channel to communicate data and command information between the at least one endpoint and the virtual port, the integrated device fabric including a multi-function logic to:
aggregate legacy interrupts to be received from the at least one endpoint;
receive power management messages from the virtual port and broadcast the power management messages to the at least one endpoint; and
determine whether a transaction results in a non-function specific error, and if so, assert a non-function specific error signal to the at least one endpoint;
the integrated device fabric further having a sideband channel to communicate sideband information between the at least one endpoint and the multi-function logic; and
the at least one endpoint including an integrated function to implement one or more high speed communication protocol functions.

2. The apparatus of claim 1, wherein the integrated device fabric is to couple to a transaction layer of the virtual port and a transaction layer of the at least one endpoint, without intervention of a link layer or a physical layer.

3. The apparatus of claim 1, wherein the multi-function logic includes a sideband endpoint to communicate with a sideband router via the sideband channel, the sideband router further coupled to the at least one endpoint.

4. The apparatus of claim 1, wherein the integrated device fabric further includes an arbiter to arbitrate messages along the primary channel from the virtual port to a plurality of endpoints coupled to the integrated device fabric.

5. The apparatus of claim 4, wherein the multi-function logic includes a first logic to detect a non-function specific error message from at least one of the plurality of endpoints via the sideband channel and to generate an aggregate message for transmission to the virtual port via the primary channel.

6. The apparatus of claim 4, wherein the multi-function logic includes a second logic to receive a first power management message from the virtual port via the primary channel and to generate a downstream power management message to at least one of the plurality of endpoints via the sideband channel.

7. The apparatus of claim 1, wherein the at least one endpoint comprises a plurality of endpoints including heterogeneous blocks and wherein the integrated device fabric is to standardize communication between the heterogeneous blocks and the virtual port.

8. The apparatus of claim 7, wherein the integrated device fabric and the plurality of endpoints appear to software as a single Peripheral Component Interconnect (PCI) endpoint coupled via a PCI link.

9. The apparatus of claim 1, further comprising a first fusible link to couple the integrated device fabric to a switch fabric via the virtual port, wherein the virtual port acts as a switch port when the first fusible link is enabled, and a second fusible link to couple to the integrated device fabric to a hub agent via the virtual port, wherein the virtual port acts as a root port when the second fusible link is enabled.

10. The apparatus of claim 1, wherein the high speed communication protocol comprises a Peripheral Component Interconnect Express (PCIe) communication protocol.

11. A method comprising:
aggregating, in a multi-function logic of an integrated device fabric coupled to a virtual root port, legacy interrupts received from at least one endpoint coupled to the integrated device fabric;
receiving, in the multi-function logic, power management messages from the virtual root port and broadcasting the power management messages to the at least one endpoint;
determining, in the multi-function logic, whether a transaction results in a non-function specific error, and if so, asserting a non-function specific error signal to the at least one endpoint; and performing a function using the at least one endpoint, wherein the virtual root port, the integrated device fabric and the at least one endpoint are formed on a single semiconductor die.

12. The method of claim 11, further comprising arbitrating messages along a primary channel from the virtual root port to a plurality of endpoints coupled to the integrated device fabric.

13. The method of claim 12, further comprising detecting, in a first logic of the multi-function logic, a non-function specific error message from the plurality of endpoints via a sideband channel and generating an aggregate message for transmission to the virtual root port via the primary channel.

14. The method of claim 13, further comprising receiving, in a second logic of the multi-function logic, a power management message from the virtual root port via the primary channel and generating a downstream power management message to the plurality of endpoints via the sideband channel.

15. The method of claim 12, further comprising standardizing communication between the plurality of endpoints and the virtual root port, wherein the plurality of endpoints are heterogeneous blocks.

16. A system comprising:
a processor;
a root complex fabric coupled to the processor;
a virtual root port coupled between the root complex fabric and an integrated device fabric;
the integrated device fabric coupled between the virtual root port and an endpoint device and having a primary channel to communicate data and command information between the endpoint device and the virtual root port and a sideband channel to communicate sideband information between the endpoint device and a multi-function logic of the integrated device fabric, the multi-function logic to:
aggregate legacy interrupts received from the endpoint device
receive power management messages from the virtual root port and broadcast the power management messages to the endpoint device; and
determine whether a transaction results in a non-function specific error, and if so, assert a non-function specific error signal to the endpoint device; and
the endpoint device including a plurality of integrated functions, wherein the virtual root port, the integrated device fabric and the endpoint device are integrated on a single semiconductor die.

17. The system of claim 16, wherein the integrated device fabric couples to a transaction layer of the virtual root port and a transaction layer of the endpoint device, without intervention of a link layer or a physical layer.

18. The system of claim 16, wherein the multi-function logic includes a sideband endpoint to communicate with a sideband router via the sideband channel, the sideband router further coupled to the endpoint device.

19. The system of claim 16, wherein the integrated device fabric further includes an arbiter to arbitrate messages along the primary channel from the virtual root port to a plurality of endpoint devices coupled to the integrated device fabric.

20. An apparatus comprising:
a processor;
a first fabric coupled to the processor;
a logic coupled between the first fabric and an integrated device fabric, the logic including a set of configuration registers;
the integrated device fabric coupled between the logic and an endpoint device and having a primary channel to communicate data and command information between the endpoint device and the logic and a sideband channel to communicate sideband information between the endpoint device and a multi-function logic of the integrated device fabric, the multi-function logic to:
receive power management messages from the logic and broadcast the power management messages to the endpoint device, the power management messages to include a power management event message, a turn off message, and a turn off acknowledge message, and wherein the power management messages include a bus, device and function number of an originator; and
determine whether a transaction results in a non-function specific error, and if so, assert a non-function specific error signal to the endpoint device, wherein the non-function specific error is to include at least one of an unsupported request and an unexpected completion; and
the endpoint device including a plurality of integrated functions.

21. The apparatus of claim 20, wherein the integrated device fabric couples to a transaction layer of the logic and a transaction layer of the endpoint device, without intervention of a link layer or a physical layer.

22. The apparatus of claim 20, wherein the multi-function logic includes a sideband endpoint to communicate with a sideband router via the sideband channel, the sideband router further coupled to the endpoint device.

23. The apparatus of claim 20, wherein the integrated device fabric further includes an arbiter to arbitrate messages along the primary channel from the logic to a plurality of endpoint devices coupled to the integrated device fabric.

24. The apparatus of claim 20, further comprising a plurality of endpoint devices coupled to the integrated device fabric.

25. The apparatus of claim 24, wherein at least one of the plurality of endpoint devices is of a manufacturer of the apparatus and at least another of the plurality of endpoint devices is of a different vendor, the apparatus comprising a system on a chip (SoC).

26. The apparatus of claim 20, wherein the multi-function logic is to aggregate legacy interrupts received from the endpoint device.

27. The apparatus of claim 20, wherein the logic, the integrated device fabric and the endpoint device are integrated on a single semiconductor die.

* * * * *